United States Patent
Takigawa (12) 
(10) Patent No.: US 6,226,249 B1
(45) Date of Patent: May 1, 2001

(54) PICKUP UNIT HAVING A FIRST CHASSIS AND A SECOND CHASSIS SUPPORTED BY A ROTARY SHAFT

(75) Inventor: Makito Takigawa, Fukushima-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/052,616

(22) Filed: Mar. 31, 1998

(30) Foreign Application Priority Data

Apr. 1, 1997 (JP) .................................................. 9-082825

(51) Int. Cl.$^7$ .................................................. G11B 33/02
(52) U.S. Cl. .......................................... 369/77.1; 369/75.2
(58) Field of Search ................................. 369/75.1, 75.2, 369/77.1, 77.2, 270

(56) References Cited

U.S. PATENT DOCUMENTS

| | | | |
|---|---|---|---|
| 4,627,037 | * 12/1986 | Tamaru | 369/77.2 |
| 4,680,748 | * 7/1987 | Kobayashi | 369/77.1 |
| 4,730,300 | 3/1988 | Kamoshita et al. | |
| 4,764,917 | * 8/1988 | Sugihara et al. | 369/77.1 |
| 5,204,850 | 4/1993 | Obata | 369/75.2 |
| 5,301,179 | * 4/1994 | Okamoto | 369/77.2 |
| 5,909,420 | * 6/1999 | Nakamichi | 369/77.1 |
| 5,974,017 | * 10/1999 | Niioka et al. | 369/77.2 |

FOREIGN PATENT DOCUMENTS 0 518 259 A2   12/1992   (EP) .

* cited by examiner

Primary Examiner—Brian E. Miller
Assistant Examiner—Kenneth Fields
(74) Attorney, Agent, or Firm—Brinks Hofer Gilson & Lione (57) ABSTRACT

A pickup unit which includes a first chassis having mounted thereon a spindle motor for use in disc rotation and a DC motor serving as a drive source, and a second chassis having a disc clamper and a driving force transmission gear. The first and second chassises are combined in such a manner that they can be opened and closed around a rotary shaft. A drive shaft of the DC motor is provided with a worm gear, and an intermediate gear meshing with the worm gear is provided on the second chassis to transmit a driving force to the driving force transmission gear, and at the same time. the axis of the drive shaft of the DC motor is placed in line with the axis of the rotary shaft.

3 Claims, 6 Drawing Sheets

PICKUP UNIT HAVING A FIRST CHASSIS AND A SECOND CHASSIS SUPPORTED BY A ROTARY SHAFT

BACKGROUND OF THE INVENTION

1. Field of the Invention

The present invention relates to a pickup unit for use in a recording/reproducing apparatus for inserting and ejecting a recording medium to and from an entrance to perform recording and/or reproducing of information thereon.

2. Description of the Related Art

Recording/reproducing apparatuses, such as VTRs, CD players, CD-ROM changers are constructed so that a disc placed on a tray is inserted into the apparatus, and the disc is clamped and rotationally driven.

In general, in the CD-ROM changers, for example, a disc placement section and a mechanical section are provided inside a box-shaped casing, and a tray-type magazine is loaded in the disc placement section from an insertion slot.

In addition, in the CD-ROM changers, a tray selected from a plurality of trays in a magazine M loaded in the disc placement section is drawn out by a tray loading mechanism, the disc is clamped within a pickup unit provided in the mechanical section, and the disc is rotationally driven by a turntable of the pickup unit.

The pickup unit includes a pickup chassis having a spindle motor mounted thereon for use in picking up and rotating the disc, and a moving chassis having a disc clamper, a driving force transmission gear, and a DC motor serving as a drive source.

According to the above conventional art, however, if the DC motor is mounted on the moving chassis, the DC motor section is projected and prevents a reduction in thickness. Thus, the DC motor is mounted on the pickup chassis, and the driving force of the DC motor is transmitted to the driving force transmission gear provided on the side of the moving chassis through a gear.

When the pickup chassis and moving chassis are constructed in such a manner that they can be opened and closed around a rotary shaft, if the driving force transmission gear and the DC motor for driving the driving force transmission gear are provided on separate chassis as described above, the pickup chassis and the movable chassis are inclined between the DC motor and the driving force transmission gear. Therefore, a universal joint and so forth are required for the unit and the structure becomes complicated, so that not only the cost increases, but also transmission reliability of the driving force is unstable.

SUMMARY OF THE INVENTION

It is an object of the present invention to provide a pickup unit having a first chassis and a second chassis combined around a rotary shaft in such a manner that they can be opened and closed even if a driving force transmission gear and a DC motor for driving the driving force transmission gear are provided on separate chassis in order to reduce the thickness or the size of the unit, the mesh of a worm gear and an intermediate gear is maintained with a simple construction regardless of the open state or the closed state of the chassis and the driving force of the DC motor is positively transmitted to the driving force transmission gear, so that operation reliability of the driving force transmission gear is increased.

It is another object of the present invention to provide a pickup unit in which a clearance is secured between an inserted tray and a DC motor in the open state of first and second chassis, the tray and a disc can be inserted without abutting against the main body outer surface of the DC motor, so that a further reduction in the thickness of the unit can be achieved.

It is a further object of the present invention to provide a pickup unit in which a first chassis and a second chassis can be disconnected by sliding connecting pins, the first chassis and the second chassis can be easily assembled and separated, and components mounted on the chassis can be efficiently exchanged and repaired.

It is a still further object of the present invention to provide a pickup unit in which a first chassis and a second chassis can be easily assembled and separated by pressing connecting pins against spring members, and the connecting pins after assembly are positively connected by spring forces of the spring members without requiring a special fallout-preventing fixture.

According to an aspect of the present invention, there is provided a pickup unit including a first chassis having mounted thereon a spindle motor for use in disc rotation and a DC motor serving as a drive source, and a second chassis having a disc clamper and a driving force transmission gear, the first and second chassis being combined in such a manner that they can be opened and closed around a rotary shaft, wherein a drive shaft of the DC motor is provided with a worm gear, and an intermediate gear meshing with the worm gear is provided on the second chassis to transmit a driving force to the driving force transmission gear, and wherein the axis of the drive shaft of the DC motor is placed in line with the axis of the rotary shaft.

According to another aspect of the present invention, there is provided a pickup unit including a first chassis having mounted thereon a spindle motor for use in disc rotation and a DC motor serving as a drive source, and a second chassis having a disc damper and a driving force transmission gear, the first and second chassis being combined in such a manner that they can be opened and closed around a rotary shaft, wherein the DC motor has flat surfaces parallel to each other on the main body outer surface thereof, and the flat surfaces are mounted to the first chassis so that they are parallel to an inserted tray or the lower surface of the disc when the first chassis and the second chassis are in the open state.

According to a further aspect of the present invention, there is provided a pickup unit including a first chassis having mounted thereon a spindle motor for use in disc rotation and a DC motor serving as a drive source, and a second chassis having a disc clamper and a driving force transmission gear, the first and second chassis being combined in such a manner that they can be opened and closed around a rotary shaft, wherein connecting pins for connecting the first chassis and the second chassis are slidable in the thickness direction of both of the chassis.

According to a still further aspect of the present invention, there is provided a pickup unit, wherein connecting pins are urged by spring members in the direction to connect the first chassis and the second chassis.

Other features and objects of the present invention will be made clear from the following description regarding the preferred embodiment, with reference to the accompanying drawings.

DESCRIPTION OF THE PREFERRED EMBODIMENT

An embodiment of a pickup unit according to the present invention which is applied to a CD-ROM changer will now be described with reference to FIGS. 1 to 7.

Figure 1:
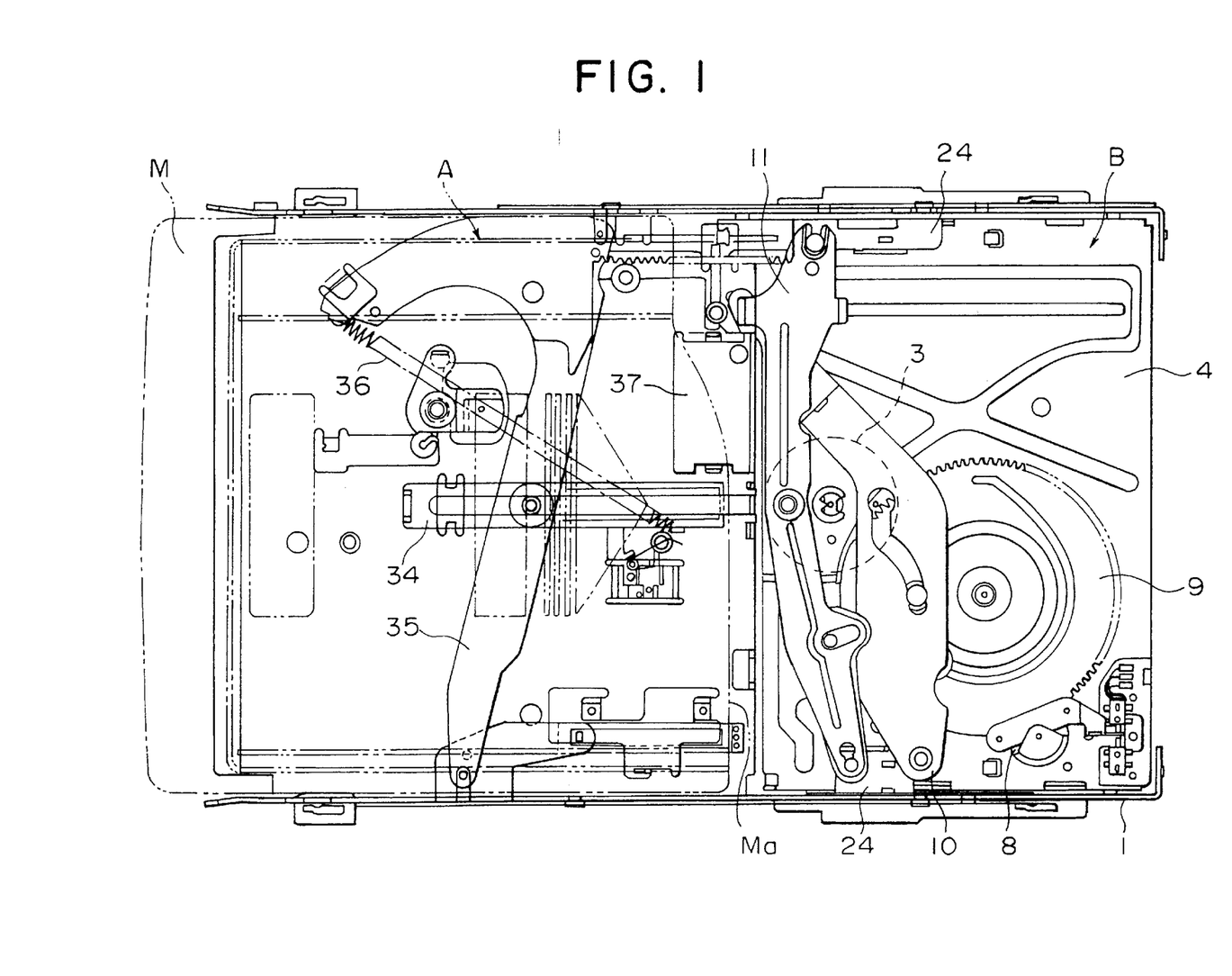
FIG. 1 is a plan view of a CD-ROM changer to which an embodiment of a pickup unit according to the present invention is applied.
Figure 2A:
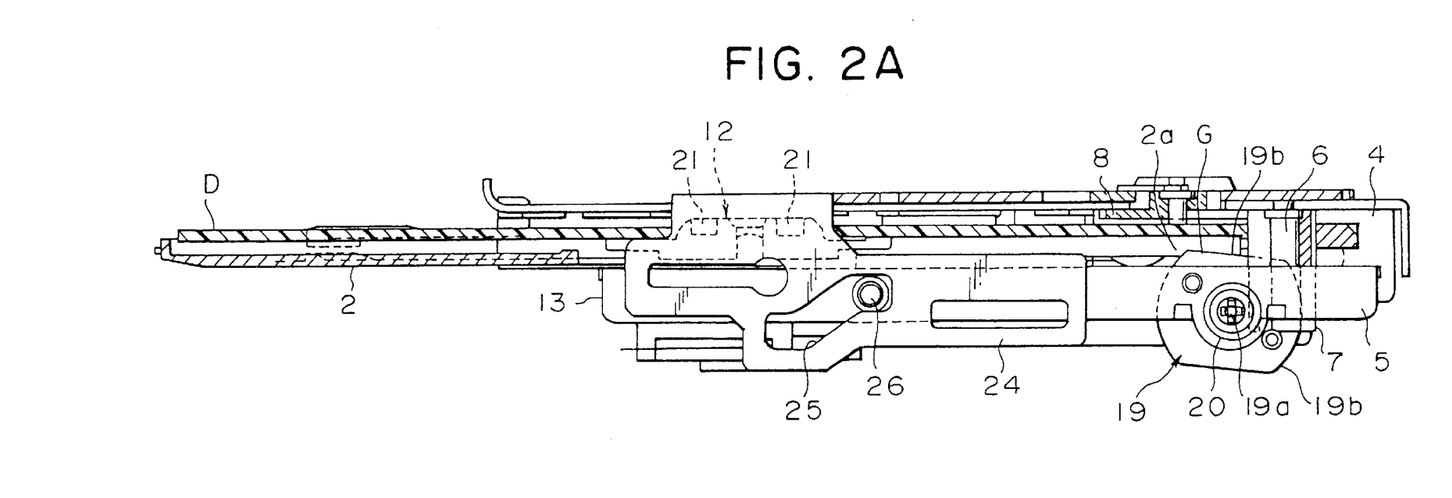
FIGS. 2A and 2B are illustrations showing a closed state and an open state of the pickup unit, respectively.
Figure 2B:
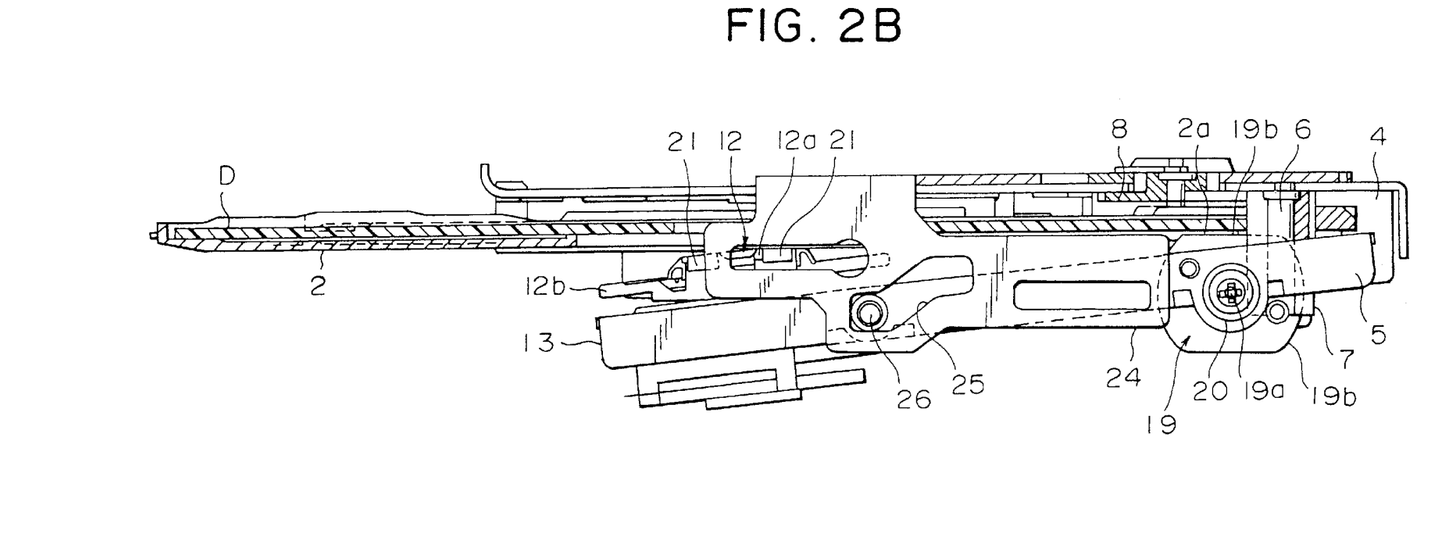

Referring to FIG. 1, a box-shaped casing 1 has a disc placement section A and a mechanical section B provided inside. A tray-type magazine M is loaded in the disc placement section A from the left of the drawing, and the right side of the magazine M in FIG. 1 becomes an outlet Ma for a disc D shown in FIG. 2.

Referring to FIG. 2, in this CD-ROM changer, a tray 2 selected from a plurality of trays in the magazine M loaded in the disc placement section A is partially drawn out, and is clamped within a disk select-drive portion in the mechanical section B, and the disc D is rotationally driven with a part thereof left in the magazine M. Referring to FIG. 1, there are provided a magazine ejecting member 34, a link 35 for raising and lowering second and first chassis 4 and 5, an eject spring 36 and a drive motor 37 for the link 35.

The mechanical section B includes a second chassis (tray chassis) 4 provided with a disc clamper 3, and a first chassis (pickup chassis) 5 which is located thereunder, and which is rotatably supported by the second chassis 4. The second chassis 4 and the first chassis 5 are guided in the mechanical section B of the casing 1 so as to move upward and downward (in a direction perpendicular to the plane of FIG. 1).

The second chassis 4 is provided with the disc clamper 3 for clamping the disc D mounted on the tray 2, an intermediate gear 7 rotatably supported by a support shaft 6 disposed downward, a driving force transmission gear consisting of gears 8 meshing with the intermediate gear 7, a cam gear 9 driven by the driving force transmission gear, a tray transport arm 10 for pulling in or pushing out the tray 2 by means of the cam gear 9, and an actuating lever 11 for opening and closing the first chassis 5 with respect to the second chassis 4.

Figure 5:
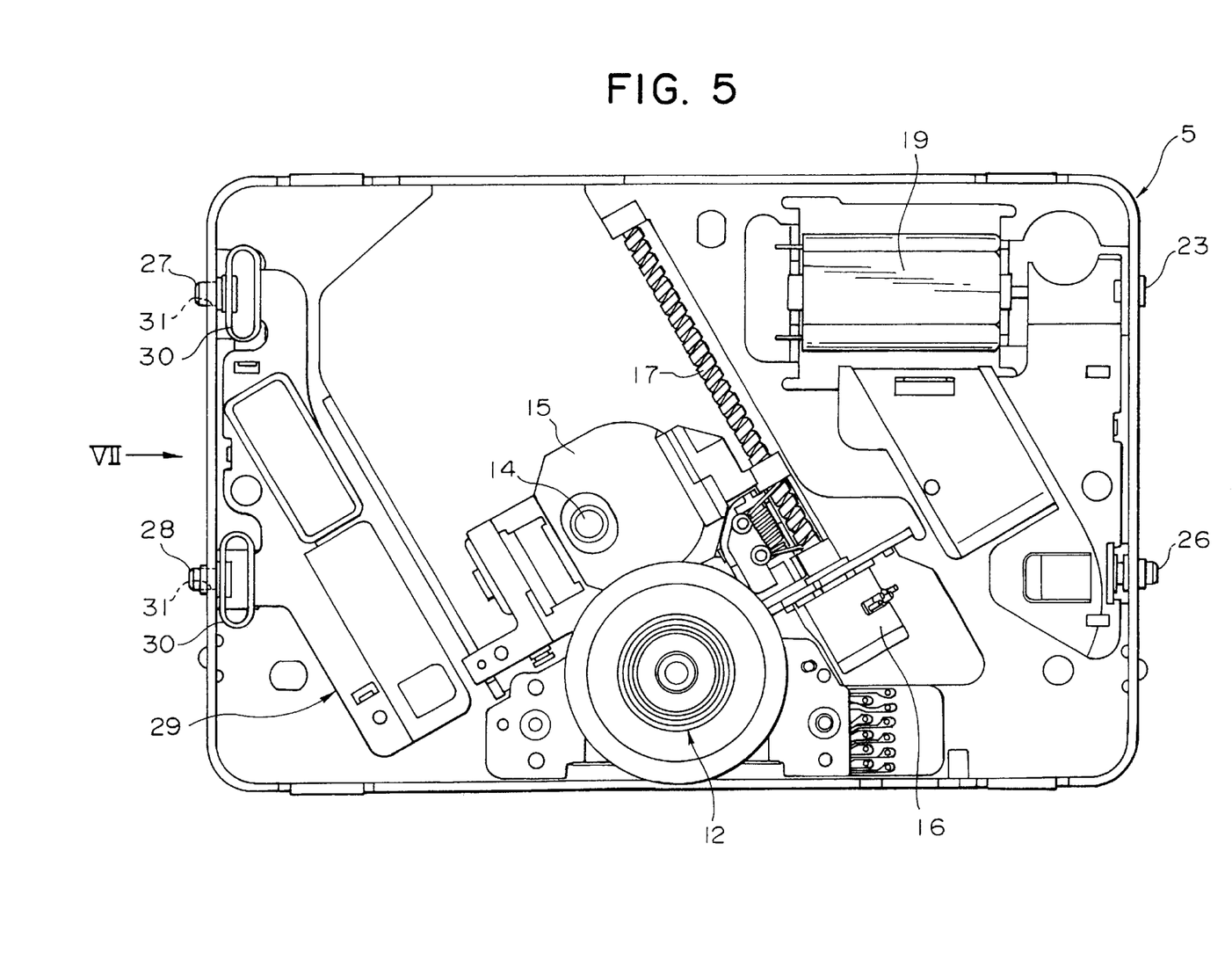
FIG. 5 is a plan view showing a second chassis.

As shown in FIG. 5, on the first chassis 5, there are mounted a turntable 12 for placing and rotating a disc thereon, a spindle motor 13 (see FIG. 2) having a drive shaft to which the turntable 12 is fixed, an optical pickup 14 for reproducing information recorded in the disc D driven by the turntable 12, and a transport mechanism having a motor 16 for transporting a carriage 15 to which the optical pickup 14 is attached and a screw shaft 17.

The first chassis 5 is rotatably supported by a rotary shaft 18 (see FIG. 7) at one end portion (near the right end in FIG. 2) below the second chassis 4. A DC motor 19 for use in tray loading having an axis L1 of a drive shaft 19a which is placed coaxially with an axis L2 of the rotary shaft 18 is mounted on the first chassis 5. A worm gear 20 is fitted and fixed to the drive shaft 19a of the DC motor 19, and the worm gear 20 meshes with the intermediate gear 7. The intermediate gear 7 is meshed with the driving force transmission gear consisting of gears 8 shown in FIGS. 3 and 4, and further, rotates the cam gear 9 to load the tray 2 by driving a tray load mechanism including the tray transport arm 10 and so forth.

In addition, the second chassis 4 and the first chassis 5 are driven to move upward and downward by a raising and lowering mechanism (not shown) including a lifting plate and so forth via the link 35 with the power of the drive motor 37 provided on the bottom plate of the casing 1. In addition, the second chassis 4 and the first chassis 5 are moved and located at the height of the selected tray 2 by an up-and-down locating mechanism (not shown). When the tray 2 in the magazine M is pulled in between the second chassis 4 and the first chassis 5 in the open state by the above tray load mechanism, the state shown in FIG. 2B is obtained.

The turntable 12 has a projection 12a having a trapezoidal cross-section formed in the center thereof, and a flange 12b formed on the outer periphery thereof, and magnets 21 are provided on the projection 12a opposingly to a magnetic section of the disc clamper 3. Therefore, at the time of clamping shown in FIG. 2A, the magnetic section of the disc clamper 3 is attracted by magnetic forces of the magnets 21 to clamp the disc D, and the disc D is rotated with the rotation of the turntable 12.

Although it is not shown in the drawing, a ring-shaped thin plate magnet is provided on the second chassis 4 located above the magnetic section of the disc clamper 3. The magnetic forces of the magnets 21 of the turntable 12 are set so as to overcome the magnetic force of the magnet (not shown) of the second chassis 4 to move the turntable 12 downward when the first chassis 5 moves upward upon completion of the tray loading, and the turntable 12 moves upward to come closer to the magnetic section of the disc damper 3. The turntable 12 is moved downward at least from immediately before the turntable 12 moves upward to a predetermined position.

A connection structure of the first chassis 5 and the second chassis 4 will now be described.

On one side of the first chassis 5 (the right side in FIG. 5), a rotary pin 23, which is inserted into a hole 22 of one side plate of the second chassis 4 to constitute the rotary shaft 18, is fixedly projected at the upper portion of the drawing, and a cam pin 26 to be inserted into a cam slot 25 of a slide cam plate 24 slidably provided on the second chassis 4 is fixedly projected.

The slide cam plates 24 are slidably guided by guide pins 33 of the second chassis 4 inserted into guide slits 32 formed in the slide cam plates 24.

In addition, on the other side of the first chassis 5 (the left side in FIG. 5), a rotary connecting pin 27, which is inserted into a hole 22 formed in the other side plate of the second chassis 4 to constitute the rotary shaft 18, is projected at the upper portion of the drawing, and a cam connecting pin 28 to be inserted into the cam slot 25 of the slide cam plate 24 slidably provided on the second chassis 4 is projected.

The rotary connecting pin 27 and the cam connecting pin 28 are integrally formed with a plastic component 29 mounted on the first chassis 5 through flattened-cylinder shaped elastic sections 30. The rotary connecting pin 27 or the cam connecting pin 28 is projected integrally with the outer peripheral surface of the flattened-cylinder shaped elastic section 30, and is integrated with the component 29 at the opposite side of the outer peripheral surface of the flattened-cylinder shaped elastic section 30. Therefore, the rotary connecting pin 27 or the cam connecting pin 28 can move in a direction which depresses each of the elastic sections 30, and an elastic restoring force is generated in the elastic section 30, so that the rotary connecting pin 27 or the cam connecting pin 28 is urged in a direction in which it is pushed back, i.e., a direction to connect the first chassis 5 and the second chassis 4. Through holes 31 are formed in the side plate of the first chassis 5 through which the rotary connecting pin 27 and the cam connecting pin 28 pass.

Figure 7:
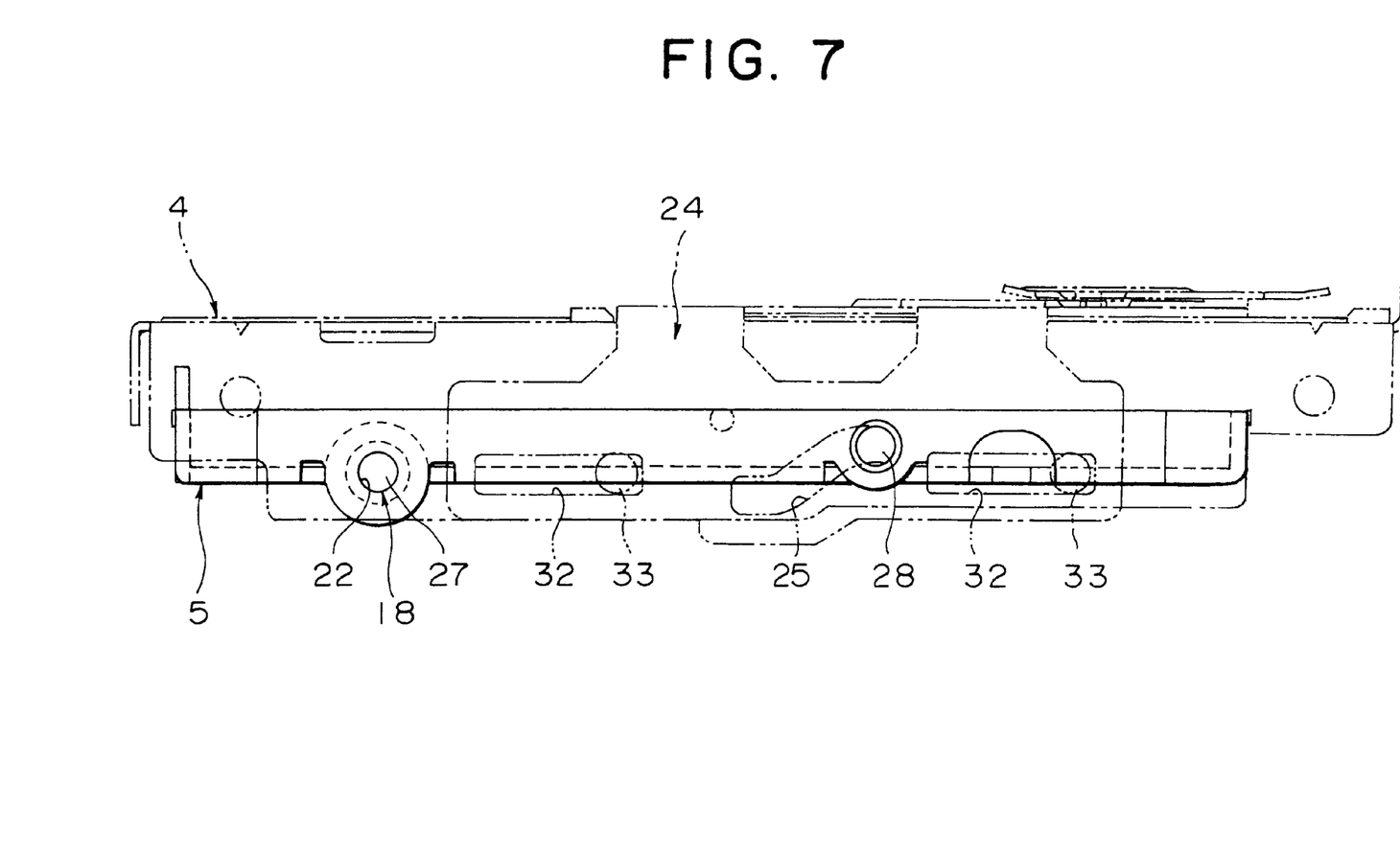
FIG. 7 is a view in the direction of the arrow VII in FIG. 5.

Thus, the first chassis 5 is rotatably supported with respect to the second chassis 4 by the rotary pin 23 and the rotary connecting pin 27 constituting the rotary shaft 18, and the cam pin 26 and the cam connecting pin 28 are moved within the cam slots 25 by a sliding action of the slide cam plates 24 of the second chassis 4, whereby the first chassis 5 is moved to the open state shown in FIG. 2B and to the closed state shown in FIGS. 2A and 7. The slide cam plates 24 are actuated by the actuating lever 11.

In addition, in this embodiment, flat surfaces 19b parallel to each other are formed on the main body outer surface of the DC motor 19. As shown in FIG. 2B, the DC motor 19 is mounted on the first chassis 5 with the flat surfaces 19b parallel to the lower surface of the inserted tray 2 when the first chassis 5 and the second chassis 4 are in the open state.

As shown in FIG. 2B, when the first chassis 5 and the second chassis 4 are in the open state and the tray 2 selected from the magazine M is loaded and accommodated in the mechanical section B, the left end of the first chassis 5 is inclined downward about the rotary shaft 18. However, since the DC motor 19 mounted on the first chassis 5 is in the state parallel to the lower surface of the inserted tray 2, a clearance is secured between the tray 2 or the disc D in the tray 2 and the main body outer surface (flat surface 19b) of the DC motor 19, so that the tray 2 and the disc D can be inserted without abutting against the main body outer surface of the DC motor 19.

When the first chassis 5 is closed, the first chassis 5 is rotated in the clockwise direction about the rotary shaft 18. Since the axis of the drive shaft 19a of the DC motor 19 is coaxially placed with the axis of rotary shaft 18 of the first chassis 5, the DC motor 19 is also rotated in the clockwise direction and the left end of the upper flat surface 19b is moved upward and projected, as shown in FIG. 2A. The turntable 12 is, however, moved upward by the closing action of the first chassis 5, and clamps the disc D on the tray 2 while raising the disc D together with the clamper 3. Therefore, although the left end G of the flat surface 19b of the DC motor 19 is moved upward, the disc D is raised, so that a clearance is secured between the disc D and the DC motor 19. An opening 2a is formed in the bottom surface of the tray 2 from which the disc D is exposed.

An assembling method of the embodiment will now be described.

Figure 6A:
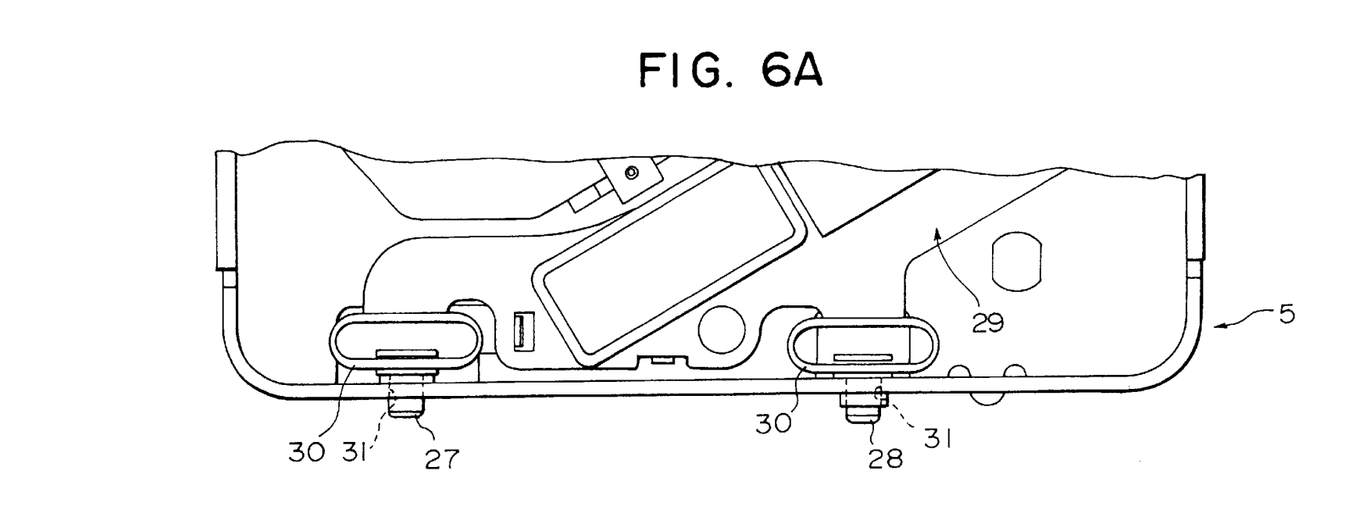
FIGS. 6A and 6B are enlarged illustrations each showing sections of connecting pins in FIG. 5.
Figure 6B:
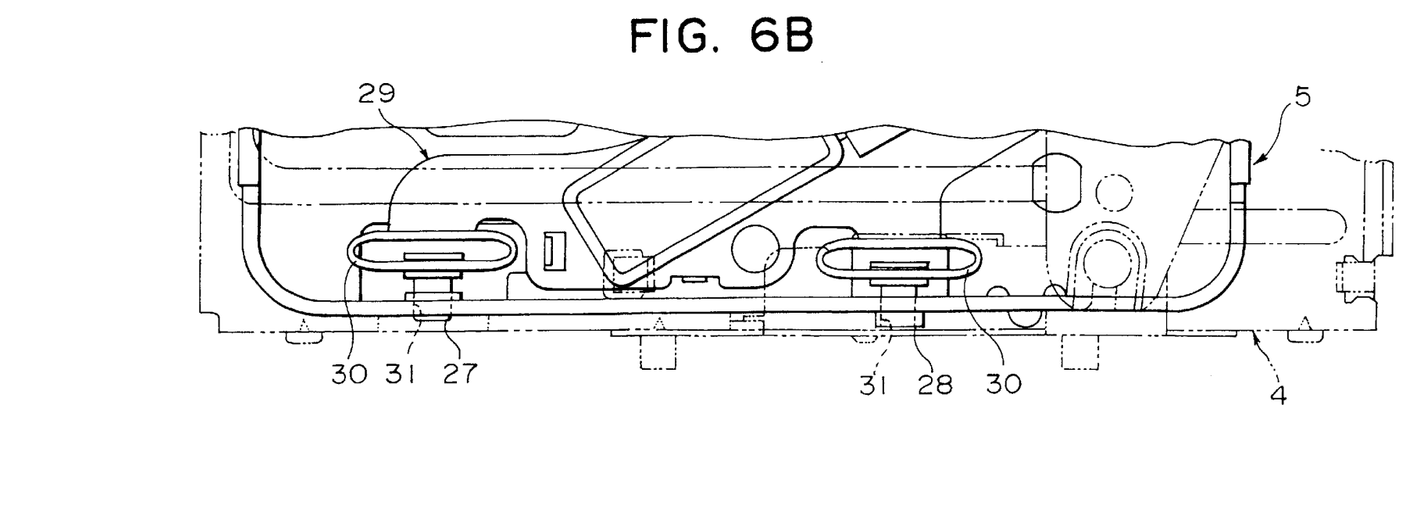

As shown in FIGS. 5 and 6, the rotary connecting pin 27 and the cam connecting pin 28 are projected from the side plate of the first chassis 5 by the elastic sections 30. The rotary pin 23 and the cam pin 26 remain projected from the opposite side plate of the first chassis 5.

The rotary pin 23 and the cam pin 26 of the first chassis 5 are first respectively inserted into the hole 22 and the cam slot 25 of the slide cam plate 24 of the second chassis 4 from below.

Next, the rotary connecting pin 27 and the cam connecting pin 28 are pressed in such a manner as to compress the elastic sections 30, and are slid while being elastically brought into contact with the inner surface of the side plate of the first chassis 5 so as to allow the rotary connecting pin 27 to reach the hole 22 and at the same time, to allow the cam connecting pin 28 to reach the cam slot 25 of the slide cam plate 24. Then, the rotary connecting pin 27 and the cam connecting pin 28 are inserted into the hole 22 and the cam slot 25, respectively, by spring forces of the elastic sections 30, so that the second chassis 4 and the first chassis 5 are combined in such a manner that they can be opened and closed around the rotary shaft 18, as shown in FIGS. 2 and 7.

To separate the second chassis 4 and the first chassis 5, the rotary connecting pin 27 and the cam connecting pin 28 inserted into the hole 22 and the cam slot 25, respectively, are pressed against the spring forces of the elastic sections 30, whereby the rotary connecting pin 27 and the cam connecting pin 28 retract from the hole 22 and the cam slot 25, respectively, thereby separating the two chassis.

The operation of the embodiment will now be described.

FIG. 2B in the following description shows the state where the tray 2 is selected from a plurality of trays in the magazine M to perform tray loading, and the selected tray 2 is pulled into the mechanical section B.

In the state shown in FIG. 2B, the cam pin 26 and the cam connecting pin 28 engaged in the cam slots 25 are moved by sliding the slide cam plate 24 from the position shown in FIG. 2A to the position shown in FIG. 2B by driving the DC motor 19, whereby the first chassis 5 is inclined in the open state. At this time, the turntable 12 of the first chassis 5 is located at the lowermost position and separated from the disc clamper 3, and the disc clamper 3 is attracted by the magnetic force of the magnet (not shown) of the second chassis 4. Therefore, the disc clamper 3 is located at a position retracted upward out of the path of the tray 2, and the turntable 12 is located at a position retracted downward out of the path of the tray 2, so that the tray 2 can be inserted and removed between the turntable 12 and the disc clamper 3 from the left side of the drawing. In addition, since the turntable 12 is located below the tray 2 in the state shown in FIG. 2B, the disc D is placed on the tray 2.

When the left end of the first chassis 5 moves downward to be inclined about the rotary shaft 18 as in the state of FIG. 2B, the DC motor 19 of the first chassis 5 is parallel to the lower surface of the inserted tray 2 (or the lower surface of the disc D exposed from the opening of the lower surface of the tray 2), so that a clearance is secured between the tray 2 (or the disc D within the tray 2) and the main body outer surface (flat surface 19b) of the DC motor 19, the tray 2 can be inserted without abutting against the main body outer surface of the DC motor 19, and a further reduction in the thickness of the unit can be achieved.

When the DC motor 19 is driven to slide the slide cam plate 24 from the position shown in FIG. 2A to the position shown in FIG. 2B, the cam pin 26 and the cam connecting pin 28 are moved in the cam slots 25, whereby the first chassis 5 is moved upward. This action allows the turntable 12 of the first chassis 5 to be moved upward to come closer to the disc clamper 3, so that the disc D is clamped and rotated together with the turntable 12.

During the clamping operation, the disc D is raised from the tray 2 by the turntable 12, and is separated from the tray 2 as shown in FIG. 2A when the clamping is completed.

In addition, with the rotation of the first chassis 5 in the clockwise direction about the rotary shaft 18 due to the clamping operation, the DC motor 19 is also rotated in the clockwise direction from the state shown in FIG. 2B, and the left end G of the upper flat surface 19b is moved upward and projected to advance into the opening 2a of the tray 2. However, since the disc D is raised from the tray 2 as described above, the clearance is secured between the left end G of the raised flat surface 19b and the lower surface of the disc D, and the disc D does not contact the DC motor 19 to interfere with the recording/reproducing operation.

The driving force transmission path from the DC motor 19 will now be described.

Figure 3:
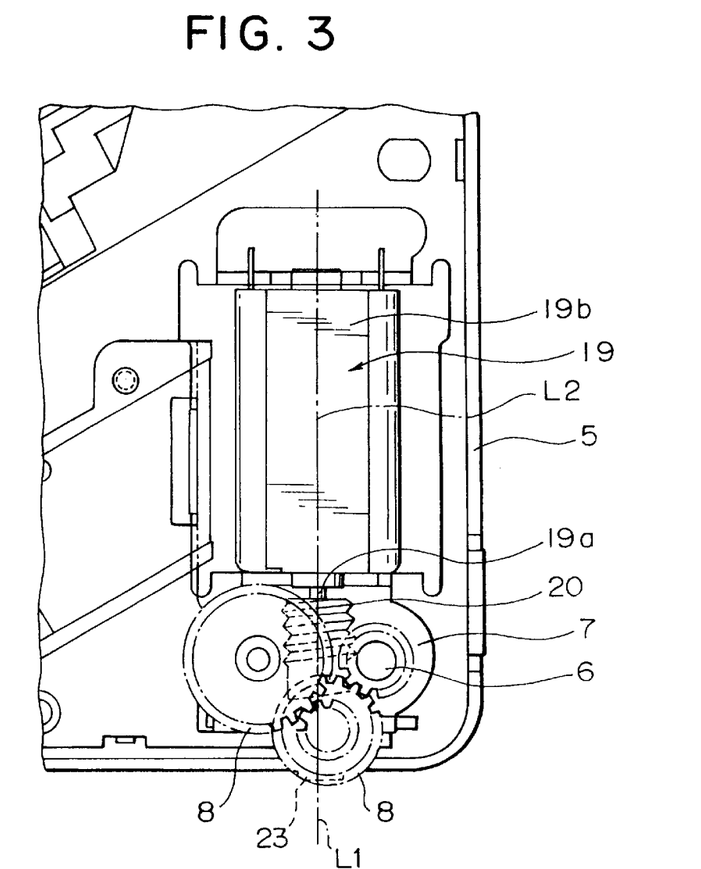
FIG. 3 is an enlarged plan view of a section of a motor.
Figure 4:
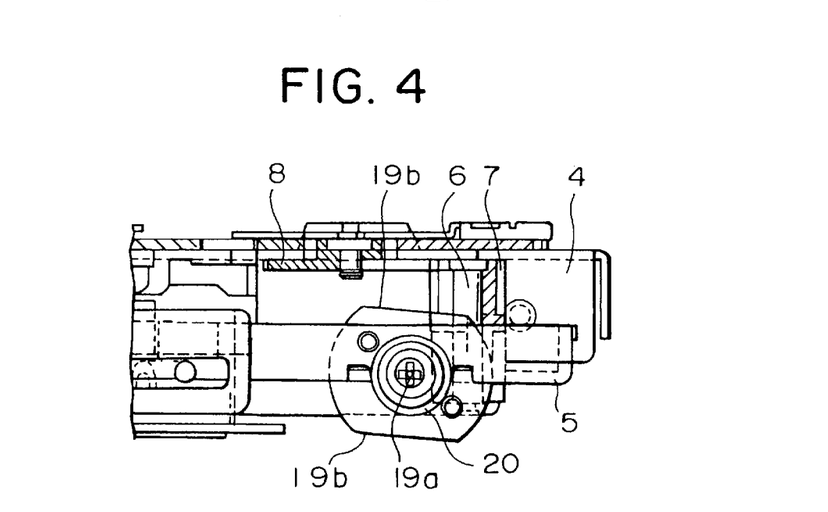
FIG. 4 is a front view of FIG. 3.

As shown in FIG. 2A, the driving force of the DC motor 19 mounted on the first chassis 5 for use in tray loading is transmitted from the worm gear 20 fitted to the drive shaft 19a to the intermediate gear 7 supported by the support shaft 6 of the upper second chassis 4, and is transmitted from the intermediate gear 7 to the driving force transmission gear consisting of gears 8 shown in FIGS. 3 and 4.

When the first chassis 5 is rotated from the closed state shown in FIG. 2A to the open state shown in FIG. 2B, the intermediate gear 7 meshed with the worm gear 20 is also rotated about the axis of the worm gear 20 because the center of rotation of the first chassis 5 (the axis L1 of the rotary shaft 18) is set in line with the axis of the worm gear 20 of the DC motor 19 (the axis L2 of the drive shaft 19a). In other words, even if the first chassis 5 is rotated, the center distance between the worm gear 20 and the intermediate gear 7 is always kept constant. Therefore, the driving force of the DC motor 19 can be transmitted to the driving force transmission gear through the intermediate gear 7 regardless of the position of the first chassis 5.

In the above embodiment, there is provided a pickup unit including a first chassis 5 having mounted thereon a spindle motor 13 for use in disc rotation and a DC motor 19 serving as a drive source, and a second chassis 4 having a disc clamper 3 and a driving force transmission gear, the first chassis 5 and the second chassis 4 being combined in such a manner that they can be opened and closed around a rotary shaft 18, wherein a drive shaft 19a of the DC motor 19 is provided with a worm gear 20, and an intermediate gear 7 meshing with the worm gear 20 is provided on the second chassis 4 to transmit a driving force to the driving force transmission gear, and wherein the axis L2 of the drive shaft 19a of the DC motor 19 is placed in line with the axis L1 of the rotary shaft 18. Therefore, even if the driving force transmission gear and the DC motor 19 for driving the driving force transmission gear are provided on separate chassis 4 and 5 in order to reduce the thickness or the size of the unit, the mesh of the worm gear 20 and the intermediate gear 7 is maintained with a simple construction regardless of the open state or the closed state of the chassis 4 and 5, and the driving force of the DC motor 19 is positively transmitted to the driving force transmission gear, so that operation reliability of the driving force transmission gear is increased.

In addition, in the above embodiment, the DC motor 19 has flat surfaces 19b parallel to each other on the main body outer surface thereof, and the flat surfaces 19b are mounted to the first chassis 5 so that they are parallel to an inserted tray 2 or the lower surface of a disc D when the first chassis 5 and the second chassis 4 are in the open state. Therefore, since the flat surfaces 19b of the DC motor 19 are not inclined with respect to the tray 2 or the lower surface of the disc D in the open state of the chassis 4 and 5, a clearance is secured between the inserted tray 2 and the DC motor 19, and the tray 2 and the disc D can be inserted without abutting against the main body outer surface of the DC motor 19, so that a further reduction in the thickness of the unit can be achieved.

Further, in the above embodiment, a rotary connecting pin 27 and a cam connecting pin 28 for connecting the first chassis 5 and the second chassis 4 are slidable in the thickness direction of both of the chassis 5 and 4. Therefore, since the first chassis 5 and the second chassis 4 can be disconnected by sliding the rotary connecting pin 27 and the cam connecting pin 28, the first chassis 5 and the second chassis 4 can be easily assembled and separated, and components mounted on the chassis 5 and 4 can be efficiently exchanged and repaired.

Still further, in the above embodiment, the rotary connecting pin 27 and the cam connecting pin 28 are urged by elastic members 30 in the direction to connect the first chassis 5 and the second chassis 4. Therefore, the first chassis 5 and the second chassis 4 can be easily assembled and separated by pressing the rotary connecting pin 27 and the cam connecting pin 28 against spring forces of the elastic members 30, and the rotary connecting pin 27 and the cam connecting pin 28 after assembly are positively connected by the spring forces of the elastic members 30 without requiring a special fallout-preventing fixture.

What is claimed is:

1. A pickup unit, comprising:

a first chassis having mounted thereon a turntable for placing a disc thereon, a spindle motor for rotationally driving the turntable, and a DC motor serving as a drive source; and a second chassis having a disc clamper a tray loading mechanism for pulling in a tray having the disc placed thereon, and a driving force transmission gear for driving said tray loading mechanism, said first and second chassis being rotatable about a rotary shaft from an open position to a closed position whereby the disc placed on said turntable is pressed by said clamper;

wherein a drive shaft of said DC motor is provided with a worm gear, and an intermediate gear meshing with the worm gear is provided on said second chassis to transmit a driving force to said driving force transmission gear via said intermediate gear, and wherein an axis of the drive shaft of said DC motor is placed in line with the axis of said rotary shaft such that the worm gear engages the intermediate gear when the first and second chassis are in the open position and when the first and second chassis are in the closed position.

2. A pickup unit according to claim 1, wherein said DC motor has flat surfaces parallel to each other formed on the main body outer surface thereof, and said DC motor is mounted on said first chassis so that said flat surfaces are parallel to a tray inserted between said first chassis and said second chassis or a lower surface of the disc when said first chassis and said second chassis are in the open position.

3. A pickup unit according to claim 1, wherein said rotary shaft consists of a connecting pin for connecting said first chassis and said second chassis, and the connecting pin is slidable in the thickness direction of said first chassis and said second chassis such that the connecting pin can be removed.

* * * * *

UNITED STATES PATENT AND TRADEMARK OFFICE
CERTIFICATE OF CORRECTION

PATENT NO. : 6,226,249 B1
DATED : May 1, 2001
INVENTOR(S) : Makito Takigawa

It is certified that error appears in the above-identified patent and that said Letters Patent is hereby corrected as shown below:

Title page,
Item [73], change "Ltd. (JP)" to -- Ltd., Tokyo (JP) --.

Column 2,
Line 10, under "ABSTRACT", change "time. the" to -- time, the --.

Claim 1,
Line 6, immediately after "clamper" insert -- , -- (comma).

Signed and Sealed this

Eighth Day of January, 2002

Attest:

JAMES E. ROGAN
Attesting Officer    Director of the United States Patent and Trademark Office